United States Patent
Hayakawa et al.

(10) Patent No.: US 9,062,128 B2
(45) Date of Patent: Jun. 23, 2015

(54) HYDROXYALKYL METHYLCELLULOSE HAVING SOLUBILITY AND THERMOREVERSIBLE GELATION PROPERTIES IMPROVED

(75) Inventors: Kazuhisa Hayakawa, Joetsu (JP); Rumiko Itoh, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 1146 days.

(21) Appl. No.: 12/961,006

(22) Filed: Dec. 6, 2010

(65) Prior Publication Data

US 2011/0077391 A1    Mar. 31, 2011

Related U.S. Application Data

(62) Division of application No. 12/098,155, filed on Apr. 4, 2008, now abandoned.

(30) Foreign Application Priority Data

Apr. 20, 2007 (JP) ................................ 2007-111546

(51) Int. Cl.
*C08B 11/193* (2006.01)

(52) U.S. Cl.
CPC .................................... *C08B 11/193* (2013.01)

(58) Field of Classification Search
CPC .................................................... C08B 11/193
USPC ........................................................... 536/91
See application file for complete search history.

(56) References Cited

U.S. PATENT DOCUMENTS

| 4,550,161 A | 10/1985 | Felcht et al. |
| 7,402,668 B2 | 7/2008 | Dannhorn et al. |
| 2002/0099203 A1 | 7/2002 | Kobayashi |
| 2003/0065165 A1* | 4/2003 | Dannhorn et al. ............. 536/91 |

FOREIGN PATENT DOCUMENTS

| EP | 1 279 680 A2 | 1/2003 |
| JP | 59-30761 A | 2/1984 |
| JP | 60-192702 A | 10/1985 |
| JP | 62-59074 A | 12/1987 |
| JP | 2001-302701 A | 10/2001 |
| WO | 2006/107294 A1 | 10/2006 |

OTHER PUBLICATIONS

N. Sarkar, Thermal Gelation Properties of Methyl and Hydroxypropyl Methylcellulose; Journal of Applied Polymer Science, vol. 24, 1073-1087 (1979); John Wiley & Sons, Inc.
Nitis Sarkar, Kinetics of Thermal Gelation of Methylcellulose and Hydroxypropylmethylcellulose in Aqueous Solutions; Carbohydrate Polymers 26 (1995) 195-203; Elsevier Science Limited, Printed in Great Britain.
N. Sarkar & L.C. Walker, Hydration-Dehydration Properties of Methylcellulose and Hydroxypropylmethylcellulose; Carbohydrate Polymers 27 (1995) 177-185; Elsevier Science Limited; Printed in Great Britain.
Japanese Office Action Mailed on Oct. 10, 2012 With English Language Translation of Japanese Office Action Mailed on Oct. 10, 2012 Corresponding Japanese Patent Application No. 2008-109864 to Present Application.

* cited by examiner

*Primary Examiner* — Scarlett Goon
(74) *Attorney, Agent, or Firm* — Roberts Mlotkowski; Safran & Cole, P.C.; David S. Safran

(57) ABSTRACT

Provided is hydroxyalkyl methylcellulose which can be dissolved at room temperature of 20 to 30° C. and has high thermoreversible gel strength during thermoreversible gelation. More specifically, provided is water-soluble hydroxyalkyl methylcellulose having a molar substitution of hydroxyalkoxyl groups of 0.05 to 0.1 and a substitution degree of methoxyl groups of 1.6 to 1.9, wherein the hydroxyalkoxyl groups are classified into substituted hydroxyalkoxyl groups having hydroxyl groups of hydroxyalkoxyl groups substituted further with methoxyl groups and unsubstituted hydroxyalkoxyl groups having hydroxyl groups of hydroxyalkoxyl groups not further substituted; and a ratio (A/B) of a molar fraction (A) of the substituted hydroxyalkoxyl groups to a molar fraction (B) of unsubstituted hydroxyalkoxyl groups is 0.4 or greater.

2 Claims, No Drawings

HYDROXYALKYL METHYLCELLULOSE HAVING SOLUBILITY AND THERMOREVERSIBLE GELATION PROPERTIES IMPROVED

CROSS REFERENCE TO RELATED APPLICATION

This application is a division of commonly owned, co-pending U.S. patent application Ser. No. 12/098,155, filed Apr. 4, 2008.

BACKGROUND OF THE INVENTION

1. Field of the Invention

The present invention relates to hydroxyalkyl methylcelluloses having excellent thermoreversible gel strength and improved solubility.

2. Description of the Related Art

In hydroxypropyl methylcellulose obtained by ether-substitution of methyl groups and hydroxypropyl groups to cellulose, methoxyl groups are localized in the molecule relative to the cellulose chain. Hydroxypropyl methylcellulose has therefore "thermoreversible gelation properties". Described specifically, when an aqueous solution of hydroxypropyl methylcellulose is heated, hydrophobic hydration of the methoxyl groups localized in the molecule occurs and it turns into a hydrous gel. When the resulting gel is cooled, on the other hand, hydrophobic hydration decreases, whereby the gel returns to the original aqueous solution. Because of such thermoreversible gelation properties, the aqueous solution shows excellent shape retention even after heating. For example, when hydroxyalkyl methylcellulose is used as a binder for extrusion of ceramics, the hydroxyalkyl methylcellulose dissolved in water is mixed, kneaded with ceramic particles, formed into a certain shape, and dried with heating wherein the hydroxyalkyl methylcellulose turns into a gel by heating. When the gelled portion has high strength, defects such as cracks caused by shrinkage strain during drying can be prevented. Hydroxyalkyl methylcelluloses are therefore used exclusively as a binder for extrusion of ceramics.

Methylcellulose having no hydroxyalkoxyl groups has excellent thermoreversible gelation performance. The thermoreversible gel strength of the methylcellulose is determined by placing a 2.5% by weight aqueous solution of it in a constant temperature bath of 80° C. so as to cause thermoreversible gelation after 15 minutes; inserting a cylindrical rod having a diameter of 15 mm downward into the gel at a rate of 5 cm/min; and measuring a maximum load (g) applied to the cylindrical rod when it is inserted into 2 cm inside of the gel. The thermoreversible gel strength is obtained by dividing the maximum load (g) by the cross-sectional area of the rod. The thermoreversible gel strength thus determined is as high as from 500 to 700 $g/cm^2$. When such methylcellulose is used for extrusion of ceramic particles, followed by drying with heating, cracks due to shrinkage strain during drying can be minimized. Even if the amount of methylcellulose added to the ceramic is reduced, defects caused by cracks during drying can be reduced.

When a molar substitution of hydroxyalkoxyl groups of more than 0.1 is introduced into methylcellulose, the resulting hydroxyalkyl methylcellulose has thermoreversible gel strength of 100 $g/cm^2$ or less. For example, hydroxypropyl methylcellulose having a molar substitution of hydroxypropoxyl groups of 0.15 and a substitution degree of methoxyl groups of 1.8 renders thermoreversible gel strength of 30 $g/cm^2$. Hydroxyethyl methylcellulose having a molar substitution of hydroxyethoxyl groups of 0.15 and a substitution degree of methoxyl groups of 1.8 renders thermoreversible gel strength of 25 $g/cm^2$. This means that when high thermoreversible gel strength is required, methylcellulose having no hydroxyalkoxyl groups introduced is preferred. In order to dissolve methylcellulose having no hydroxyalkoxyl groups introduced in water, however, a water temperature has to be adjusted to 10° C. or less. Methylcellulose insoluble in water cannot render its original thermoreversible gel strength and therefore becomes practically useless. It is therefore difficult to use methylcellulose having no hydroxyalkoxyl groups introduced.

Japanese Patent Application Examined Publication No. 62-059074/1987 discloses that hydroxyalkyl methylcelluloses having a molar substitution of hydroxyalkoxyl groups of 0.02 to 0.13 can dissolve in water after a predetermined time even when the temperature is set at approximately 30° C., indicating that dissolution is possible without the dissolution temperature decreased. Further, Japanese Patent Application Examined Publication No. 62-059074/1987 discloses that the thermoreversible gelation temperature of methylcellulose can be raised by introduction of hydroxyalkoxyl groups therein.

SUMMARY OF THE INVENTION

Japanese Patent Application Examined Publication No. 62-059074/1987 discloses that methylcellulose having hydroxyalkoxyl groups introduced can have a higher thermoreversible gelation temperature than that of the methylcellulose having no hydroxyalkoxyl groups, but does not disclose whether the high thermoreversible gelation strength can be maintained or not. The present inventors have found that the hydroxyalkyl methylcellulose described by Japanese Patent Application Examined Publication No. 62-059074/1987 does not always have necessary thermoreversible gelation strength. Accordingly, there is a demand for the development of hydroxyalkyl methylcellulose such as hydroxypropyl methylcellulose and hydroxyethyl methylcellulose which can dissolve easily even without the temperature lowered to 10° C. or less and which has higher strength of thermoreversible gel which is produced by heating the solution of hydroxyalkyl methylcellulose.

With the foregoing in view, the present invention has been made. An object of the present invention is to provide hydroxyalkyl methylcellulose which can be dissolved at a room temperature of 20 to 30° C. and have high thermoreversible gel strength when it becomes thermoreversible gel.

With a view to accomplishing the above-described object, the present inventors have carried out an intensive investigation. As a result, it has been found that water-soluble hydroxyalkyl methylcellulose having a molar substitution of hydroxyalkoxyl groups of from 0.05 to 0.1, a substitution degree of methoxyl groups of from 1.6 to 1.9, and a ratio of (A/B) of 0.4 or greater wherein (A) is a molar fraction of substituted hydroxyalkoxyl groups having hydroxyl groups of hydroxyalkoxyl groups substituted further with methoxyl groups and (B) is a molar fraction of unsubstituted hydroxylakoxyl groups having hydroxyl groups of hydroxyalkoxyl groups not substituted further with methoxyl groups, can dissolve at a room temperature of from 20 to 30° C. and have thermoreversible gel strength comparable to that of methylcellulose having no hydroxyalkoxyl groups introduced and sufficiently higher than that of commercially available hydroxypropyl methylcellulose or hydroxyethyl methylcellulose, leading to the completion of the present invention.

According to the present invention, there is provided water-soluble hydroxyalkyl methylcellulose having a molar substitution of hydroxyalkoxyl groups of from 0.05 to 0.1 and a substitution degree of methoxyl groups of from 1.6 to 1.9, wherein the hydroxyalkoxyl groups are classified into substituted hydroxyalkoxyl groups having hydroxyl groups of hydroxyalkoxyl groups substituted further with methoxyl groups and unsubstituted hydroxylakoxyl groups having hydroxyl groups of hydroxyalkoxyl groups not further substituted and a ratio (A/B) of a molar fraction (A) of the substituted hydroxyalkoxyl groups to a molar fraction (B) of the unsubstituted hydroxyalkoxyl groups is 0.4 or greater.

According to the present invention, there is also provided a method for preparing water-soluble hydroxyalkyl methylcellulose, comprising steps of:

reacting cellulose and an alkali to obtain an alkali cellulose; and reacting the alkali cellulose with a hydroxyalkyl etherification agent and a methyl etherification agent to obtain a water-soluble hydroxyalkyl methylcellulose having a molar substitution of hydroxyalkoxyl of from 0.05 to 0.1 and a substitution degree of methoxyl of from 1.6 to 1.9, the hydroxyalkoxyl groups being classified into substituted hydroxyalkoxyl groups having hydroxyl groups of hydroxyalkoxyl groups substituted further with methoxyl groups and unsubstituted hydroxyalkoxyl groups having hydroxyl groups of hydroxyalkoxyl groups not further substituted and a ratio (A/B) of a molar fraction (A) of the substituted hydroxyalkoxyl groups to a molar fraction (B) of the unsubstituted hydroxyalkoxyl groups being 0.4 or greater, wherein the step for obtaining the water-soluble hydroxyalkyl methylcellulose comprises a stage of adding the hydroxyalkyl etherification agent and a stage of adding the methyl etherification agent after the reaction between the hydroxylalkyl etherification agent and the alkali cellulose; or a stage of adding the hydroxyalkyl etherification agent and the methyl etherification agent so that 40% by weight or greater of a stoichiometric amount of the methyl etherification agent remains unreacted upon completion of the reaction of 60% by weight or greater of a stoichiometric amount of the hydroxyalkyl etherification agent.

According to the present invention, provided is a water-soluble hydroxyalkyl methylcellulose which can dissolve at a room temperature of from 20 to 30° C. and have high thermoreversible gel strength when it becomes a thermoreversible gel.

BEST MODE FOR CARRYING OUT THE INVENTION

The present invention will hereinafter be described specifically.

Although no particular limitation is imposed on the water-soluble hydroxyalkyl methylcellulose to be used in the present invention having a molar substitution of hydroxyalkoxyl groups of 0.05 to 0.1 and a substitution degree of methoxyl groups of 1.6 to 1.9, it may be prepared by impregnating cellulose with a predetermined amount of an aqueous alkali solution as presented in Japanese Patent Application Unexamined Publication No. 2001-302701, and then reacting the resulting alkali cellulose with necessary amounts of a methyl etherification agent (preferably methyl chloride) and a hydroxyalkyl etherification agent (preferably propylene oxide or ethylene oxide).

The term "a molar substitution of hydroxyalkoxyl groups" as used herein means an average mole of hydroxyalkoxyl groups (preferably hydroxypropoxyl groups or hydroxyethoxyl groups) added per glucose ring unit of cellulose. The term "a substitution degree of methoxyl groups" means the average number of hydroxyl groups substituted with methoxyl groups per glucose ring unit of the cellulose.

In order to adjust a ratio (A/B) of a molar fraction (A) of substituted hydroxyalkoxyl groups having hydroxyl groups of hydroxyalkoxyl groups substituted further with methoxyl groups to a molar fraction (B) of unsubstituted hydroxyalkoxyl groups having hydroxyl groups of hydroxyalkoxyl groups not substituted further with methoxyl groups to be 0.4 or greater, an addition order or rate of etherification agents can be controlled to perform substitution of many hydroxyalkoxyl groups prior to substitution of methoxyl groups More specifically, after cellulose is reacted with a necessary amount of an alkali (preferably, a solution of caustic soda) to prepare the corresponding alkali cellulose, a hydroxyalkyl etherification agent (for example, propylene oxide or ethylene oxide) is added to perform an etherification reaction preferably at from 50 to 95° C. A methyl etherification agent (for example, methyl chloride) is then added to perform a subsequent reaction.

Alternatively, a hydroxyalkyl etherification agent (for example, propylene oxide or ethylene oxide) and a methyl etherification agent (for example, methyl chloride) are added successively or as needed so that even upon completion of the reaction of preferably 60% by weight or greater, more preferably 70% by weight or greater, still more preferably 80% by weight or greater of a stoichiometric amount of the hydroxyalkyl etherification agent, preferably 40% by weight or greater, more preferably 50% by weight or greater, still more preferably 60% by weight or greater of a stoichiometric amount of methyl chloride remains unreacted. More specifically, although the hydroxyalkyl etherification agent and the methyl etherification agent may be added simultaneously or successively in any order, a ratio of addition time of the methyl etherification agent to that of the hydroxyalkyl etherification agent may fall within a range of preferably from 1.3 to 3, especially preferably from 1.5 to 3.

According to the present invention, the water-soluble hydroxyalkyl methylcellulose may be preferably hydroxypropyl methylcellulose or hydroxyethyl methylcellulose. In other words, the hydroxyalkoxyl group introduced by the hydroxyalkyl etherification agent may be preferably a hydroxypropoxyl group or a hydroxyethoxyl group.

The molar substitution of hydroxypropoxyl groups and a substitution degree of methoxyl groups of the hydroxyalkyl methylcellulose of the present invention can be measured in accordance with the analysis method of substitution degree of hypromellose (hydroxypropyl methylcellulose) as described in the Japanese Pharmacopoeia, Fifteenth Edition or "Standard Method of Testing HYDROXYPROPYL METHYLCELLULOSE" specified in ASTM D-2363-72/USA. The molar substitution and the substitution degree can also be analyzed by NMR or infrared absorption analysis.

The substitution degree of methoxyl groups of hydroxyethyl methylcellulose can be measured by the analysis method of methylcellulose as specified in The Japanese Pharmacopoeia Fifteenth Edition or "Standard Test Method for Methylcellulose" as specified in ASTM D-1347-72/USA, as well as the method described in J. G. Cobler, et al., "Determination of Alkoxyl Substitution Ether by Gas Chromatography" or in Talanta, Vol. 9, 473-481(1962). The molar substitution of hydroxyethoxyl can be measured in accordance with Ying-ChiLee, et al., "Determination of Molar Substitution Ratio of Hydroxyethyl Starches by Gas Chromatography", Anal. Chem. 55, 332-338(1983), or "Standard Test Method for Hydroxyethylcellulose" as specified in ASTM D2364-75/USA.

In addition to the above-described analysis methods of the molar substitution or the substitution degree, another method such as H-NMR or $^{13}$C-NMR may be employed for the measurement.

When substitution of methoxyl groups follows substitution of hydroxyalkoxyl groups such as hydroxypropoxyl groups or hydroxyethoxyl groups, the hydroxyl groups of these hydroxyalkoxyl groups can be substituted further with the methoxyl groups. When the hydroxyl groups of the cellulose are substituted with methoxyl groups, on the other hand, the methoxy groups are not substituted further with hydroxyalkoxyl groups at the substitution site of the methoxyl groups because the methoxyl groups have no hydroxyl groups.

If total moles of methoxyl groups, unsubstituted hydroxyalkoxyl groups, substituted hydroxyalkoxyl groups, and substituents (OH) substituted with neither methoxyl groups nor hydroxyalkyl groups can be determined and a molar substitution of the substituted hydroxyalkoxyl groups having hydroxyl groups of hydroxyalkoxyl groups substituted further with methoxyl groups, can be determined separately, a substitution molar fraction of substituted hydroxyalkoxyl groups can be calculated by dividing the molar substitution of the substituted hydroxyalkoxyl groups by the total moles.

If the molar substitution of unsubstituted hydroxyalkoxyl groups having hydroxyl groups of hydroxyalkoxyl groups not substituted with methoxyl groups is able to be determined, a substitution molar fraction of the unsubstituted hydroxyalkoxyl groups can be calculated by dividing the molar substitution of the unsubstituted hydroxyalkoxyl groups by the total moles.

Examples of the method for analyzing a water-soluble hydroxyalkyl methylcellulose to find that it is has a ratio (A/B) of 0.4 or greater wherein (A) is a molar fraction of substituted hydroxyalkoxyl groups having hydroxyl groups of hydroxyalkoxyl groups substituted further with methoxyl groups and (B) is a molar fraction of unsubstituted hydroxyalkoxyl groups having hydroxyl groups of hydroxyalkoxyl groups not substituted further with methoxyl groups include, as described in Macromolecules, 20, 2413 (1987) or Journal of Society of Textile and Cellulose Industry Japan, 40, T-504 (1984), a method comprising steps of hydrolyzing cellulose ether in sulfuric acid, neutralizing, filtering, purifying, acetylating the purified product, subjecting the acetylated product to $^{13}$C-NMR, liquid chromatography or gas chromatography and determining based on the characteristics of each detection graph identified by using a mass analyzer.

A weight average polymerization degree of the hydroxyalkyl methylcellulose thus obtained can be determined by measuring a weight average molecular weight by using a combination of gel permeation chromatography and light scattering method in accordance with a molecular weight measuring method as described in Journal of Polymer Science and Technology, 39(4), 293-298(1982) and dividing the weight average molecular weight by a molecular weight per unit hydroxypropylmethylcellulose molecule. The kind or conditions of the solvent, temperature, column, or wavelength of the light scattering apparatus employed in the measurement of the weight average molecular weight are not limited to those described in the Journal of Polymer Science and Technology but can be selected as needed. The weight average molecular weight can also be determined by ultracentrifugation or conversion from a viscosity average molecular weight.

Hydroxyalkyl methylcellulose having a higher weight average polymerization degree tends to exhibit higher thermoreversible gel strength when it is in the form of aqueous solutions having the same concentration. Even hydroxyalkvl methylcellulose having a low weight average polymerization degree can have necessary strength by adjustment of the concentration of the aqueous solution. When it is used as a binder, a weight average polymerization degree which can provide high thermoreversible gel strength even if it is added in a small amount may be preferably from 100 to 10000. When the weight average polymerization degree is smaller than 100, sufficient thermoreversible gel strength may not be obtained for use as an additive and an amount to be added may exceed 10% by weight. When the weight average polymerization degree is higher than 10000, the preparation of the hydroxyalky methylcellulose may become difficult in practice because raw material cellulose having a certain polymerization degree have to be selected or prepared.

The cellulose (pulp) to be used for the preparation of the hydroxyalkyl methylcellulose of the present invention may include wood pulp obtained by refining the wood and cotton pulp (linter pulp) obtained from cotton fibers.

The dissolution temperature of the hydroxypropyl methylcellulose may be measured in the following manner. Hydroxypropyl methylcellulose powder and hot water are placed in a 300-ml beaker so as to prepare an 1% by weight aqueous solution of the hydroxypropyl methylcellulose. The resulting solution is cooled while stirring at 400 rpm. Viscosities of the aqueous solution are measured at predetermined temperatures of the aqueous solution. The temperature at which the slope of a line connecting the viscosities plotted against temperatures starts to blunt is measured as the dissolution temperature The thermoreversible gel strength may be determined in the following manner. A 2% by weight aqueous solution of hydroxypropyl methylcellulose is prepared, added into a 50-ml beaker and heated in a bath of 80° C. for 30 minutes to form a thermoreversible gel. The maximum force applied to a cylindrical rod having a diameter of 15 mm when the cylindrical rod is inserted by 2 cm downward into the gel at a rate of 5 cm/min is measured using a rheometer manufactured by Rheotec Co., Ltd. The thermoreversible gel strength is calculated by dividing the maximum force value by a cross-sectional area of the cylindrical rod.

EXAMPLES

The present invention will hereinafter be described more specifically by Examples and Comparative Examples. However, it should not be construed that the present invention is limited to or by these Examples.

Example 1

Wood-derived high-purity dissolving pulp manufactured by Nippon Paper Industries Co., Ltd. was pulverized with a roller mill, sifted through a 600 μm sieve and fed at a constant rate of 10 g/min to a twin-screw kneader "S1 KRC Kneader" (trade name; product by Kurimoto, Ltd., having a paddle diameter of 25 mm, an outer diameter of 255 mm, L/D=10.2, an inner volume of 0.12 liter and a rotation speed of 100 rpm). At the same time, a 49% by weight sodium hydroxide solution was fed at a constant rate of 21.5 g/min from an inlet provided at a pulp feed opening to add the aqueous alkali solution to the cellulose. Of the alkali cellulose obtained by continuous operation for about 30 minutes, a 585.0 g portion was placed in an autoclave equipped with a Ploughshare type internal agitating blade. After the pressure was reduced to −97 kPa, nitrogen was added into the autoclave to reach an atmospheric pressure. The pressure was then reduced again to −97 kPa. The 20 g of propylene oxide and 253.9 g of methyl chloride were added via a pressure pump while setting a ratio of addition times of methyl chloride to propylene oxide at 3 (60 minutes of methyl chloride addition time to 20 minutes of propylene oxide) and fishing the addition of propylene oxide prior to the addition of methyl chloride. They were reacted for 2 hours at an internal temperature of 60° C. The temperature was then raised to 90° C. over 30 minutes and kept at 90° C. for 30 minutes, whereby an etherification reaction was completed.

The reaction product was washed with hot water of 85° C. or greater and dried in a small Willey mill. It was analyzed in accordance with the analysis method of the substitution degree of hypromellose (hydroxypropyl methylcellulose) described in the Japanese Pharmacopoeia, Fifteenth Edition. As a result of the analysis, the hydroxypropyl methylcellulose thus obtained had a molar substitution of hydroxypropoxyl groups of 0.07 and a substitution degree of methoxyl groups of 1.8. The molecular weight of the hydroxypropyl methylcellulose thus obtained was determined in accordance with the molecular weight measuring method as described in Japanese Journal of Polymer Science and Technology, 39(4), 293-298(1982) and a weight average polymerization degree was calculated to be 1200.

After adding 2 ml of a 3% by weight aqueous sulfuric acid solution to 50 mg of the resulting hydroxypropylmethylcellulose and hydrolyzing the resulting mixture at 140° C. for 3 hours, the hydrolysate was neutralized with about 0.7 g of barium carbonate. To the neutralized hydrolysate was added 3 ml of methanol to dissolve and disperse the former in the latter, and the resulting solution was then centrifuged at 500 G. The supernatant was filtered through a filter having 0.45 μm openings. Reduction of the glucose ring was performed at 37 to 38° C. for 1 hour by adding 120 μl of a solution obtained by dissolving 1.5 g of $NaBH_4$ in 10 ml of a 0.2 N aqueous NaOH solution. After addition of 100 μl of acetic acid thereto, the solvent was evaporated. By adding 2 ml of pyridine and 1 ml of acetic anhydride, the acetylation was carried out at 120° C. for 3 hours. The resulting product (1 μl) was passed through DB-5 Column (trade name; product of J & W) heated to 150 to 220° C. and a retention time of each decomposed component was measured using an FID detector.

A ratio (A/B) of a molar fraction (A) of substituted hydroxypropoxyl groups having hydroxyl groups of hydroxypropoxyl groups substituted further with methoxyl groups to a molar fraction (B) of unsubstituted hydroxypropoxyl groups having hydroxyl groups of hydroxypropoxyl groups not substituted further with methoxyl groups was determined based on the ratio of areas of the peaks at which the structures Of decomposed components had been indentified in advance by a mass analyzer. The ratio (A/B) was 0.8.

The obtained hydroxypropyl methylcellulose powder and hot water were placed in a 300-ml beaker in order to prepare a 1% by weight aqueous solution of the hydroxypropylmethylcellulose. The resulting solution was cooled at a rate of 2° C. per 10 minutes while stirring at 400 rpm. The viscosity of the aqueous solution was measured relative to the temperature of the aqueous solution, and the dissolution temperature at which the slope of a line connecting the viscosities plotted against the temperature started to blunt was measured. The dissolution temperature was 25° C.

A 2% by weight aqueous solution of the resulting hydroxypropyl methylcellulose was prepared and placed in a 50 ml beaker. Thermoreversible gelation of the aqueous solution was then conducted for 30 minutes in a bath of 80° C. Thermoreversible gelation strength was determined by measuring, with a rheometer manufactured by Rheotec Co., Inc., a force applied to a cylindrical rod having a diameter of 15 mm when the rod was inserted downward into the gel by 2 cm at a rate of 5 cm/min, and dividing the force value by a cross-sectional area of the rod. The thermoreversible gelation strength was 150 $g/cm^2$.

Examples 2 to 4 and Comparative Examples 1 to 3

Hydroxypropyl methylcellulose was prepared in each of Examples 2 to 4 and Comparative Examples 1 to 3 in the same manner as in Example 1 except for the change of the kind of pulp, added amounts of methyl chloride and propylene oxide, and an addition time ratio of methyl chloride addition time to propylene oxide addition time as shown in Table 1. Using the obtained hydroxypropyl methyl cellulose, a substitution degree of methoxyl groups, a molar substitution of hydroxypropoxyl groups, a ratio (A/B) of a molar fraction (A) of substituted hydroxypropoxyl groups having hydroxyl groups of hydroxypropoxyl groups substituted further with methoxyl groups to a molar fraction (B) of unsubstituted hydroxypropoxyl groups having hydroxyl groups of hydroxypropoxyl groups not substituted further with methoxyl groups, a weight average polymerization degree, a dissolution temperature and a thermoreversible gel strength were determined in the same manner as in Example 1 as shown in Table 1.

TABLE 1

| | type of pulp | methyl chloride (MC) added (g) | propylene oxide (PO) added (g) | addition time ratio of MC/PO | substitution degree of methoxyl group | molar substitution of hydroxypropoxyl group | A/B*[1] | weight average polymerization degree | dissolution temperature (° C.) | thermo-reversible gel strength ($g/cm^2$) |
|---|---|---|---|---|---|---|---|---|---|---|
| Example 1 | wood pulp | 254 | 20 | 3 | 1.8 | 0.07 | 0.8 | 1200 | 25 | 150 |
| Example 2 | cotton pulp | 200 | 18 | 2.8 | 1.6 | 0.05 | 0.7 | 10000 | 20 | 200 |
| Example 3 | wood pulp | 206.9 | 40 | 1.5 | 1.9 | 0.07 | 0.6 | 500 | 27 | 120 |
| Example 4 | wood pulp | 220 | 20 | 1.3 | 1.7 | 0.07 | 0.4 | 1200 | 20 | 100 |
| Comp. Ex. 1 | wood pulp | 254 | 50 | 1 | 1.8 | 0.15 | 0.4 | 1200 | 35 | 30 |
| Comp. Ex. 2 | wood pulp | 220 | 80 | 1.2 | 1.7 | 0.25 | 0.5 | 1200 | 43 | 5 |
| Comp. Ex. 3 | wood pulp | 220 | 5 | 1.5 | 1.9 | 0.04 | 0.6 | 1200 | 12 | 150 |

*[1]A ratio (A/B) of a molar fraction (A) of substituted hydroxypropoxyl groups having hydroxyl groups of hydroxypropoxyl groups substituted further with methoxyl groups to a molar fraction (B) of unsubstituted hydroxypropoxyl groups having hydroxyl groups of hydroxypropoxyl groups not substituted further with methoxyl groups.

Example 5

Of the alkali cellulose obtained in Example 1, a 585.0 g portion was placed in an autoclave equipped with a Ploughshare type internal agitating blade. After the pressure was reduced to −97 kPa, nitrogen was added into the autoclave to reach an atmospheric pressure. The pressure was then reduced again to −97 kPa. The 20 g of propylene oxide was added to the autoclave via a pressure pump and reacted for two hours at the internal temperature controlled to 60° C. Subsequently, 253.9 g of methyl chloride were added to the autoclave which had been cooled to 20° C. The temperature of the autoclave was then raised to 90° C. over 30 minutes and kept at 90° C. for 30 minutes, whereby an etherification reaction was completed. Hydroxypropyl methylcellulose having a weight average polymerization degree of 1000, a substitution degree of methoxyl groups of 1.8 and a molar substitution of hydroxypropoxyl groups of 0.09 was obtained.

A ratio (A/B) of a molar fraction (A) of substituted hydroxypropoxyl groups having hydroxyl groups of hydroxypropoxyl groups substituted further with methoxyl groups to a molar fraction (B) of unsubstituted hydroxyproxyl groups having hydroxyl groups of hydroxyproxyl groups not substituted further with methoxyl groups was found to be 0.9. The dissolution temperature and the thermoreversible gel strength of the resulting hydroxypropyl methylcellulose measured in the same manner as in Exampled were 25° C. and 160 g/cm$^2$, respectively.

Examples 6 to 9 and Comparative Examples 4 to 6

In the same manner as in Example 1 except that the reaction took place for 2 hours at an internal temperature controlled to 55° C. while adding ethylene oxide in amounts shown in Table 2 instead of adding propylene oxide used in Examples 1 to 4 and Comparative Examples 1 to 3, hydroxyethyl methylcellulose shown in Table 2 was prepared in place of hydroxypropyl methylcellulose prepared in Examples 1 to 4 and Comparative Examples 1 to 3.

With regards to the hydroxyethyl methylcelluloses thus obtained, a ratio (A/B) of a molar fraction (A) of substituted hydroxyethoxyl groups having hydroxyl groups of hydroxyethoxyl groups substituted further with methoxyl groups to a molar fraction (B) of unsubstituted hydroxyethoxyl groups having hydroxyl groups of hydroxyethoxyl groups not substituted further with methoxyl groups, a weight average polymerization degree, a dissolution temperature and a thermoreversible gel strength were measured in the same manner as in Examples 1 to 4 and Comparative Examples 1 to 3. The results are shown in Table 2. The substitution degree of methoxyl groups and the molar substitution of hydroxyethoxyl groups were measured and calculated in accordance with ASTM D1347-72/USA and ASTM D2364-75/USA, respectively. The results are shown in Table 2.

Example 10

In the same manner as in Example 5 except that in the reaction of Example 5, ethylene oxide was added instead of propylene oxide in an autoclave and reacted for 2 hours at the internal temperature controlled to 55° C., hydroxyethyl methylcellulose having a weight average polymerization degree of 1000, a substitution degree of methoxyl groups of 1.8 and a molar substitution of hydroxyethoxyl groups of 0.08 was obtained.

A ratio (A/B) of a molar fraction (A) of substituted hydroxyethoxyl groups having hydroxyl groups of hydroxyethoxyl groups substituted further with methoxyl groups to a molar fraction (B) of unsubstituted hydroxyethoxyl groups having hydroxyl groups of hydroxyethoxyl groups not substituted further with methoxyl groups was found to be 0.9. The dissolution temperature and the thermoreversible gel strength of the resulting hydroxyethyl methylcellulose measured in the same manner as in Example 1 were 30° C. and 150 g/cm$^2$, respectively.

The invention claimed is:
1. A method for preparing water-soluble hydroxyalkyl methylcellulose, comprising steps of:
   reacting cellulose and an alkali to obtain alkali cellulose; and
   reacting the alkali cellulose with a hydroxyalkyl etherification agent and a methyl etherification agent to obtain a water-soluble hydroxyalkyl methylcellulose having a molar substitution of hydroxyalkoxyl groups of 0.05 to 0.1 and a substitution degree of methoxyl groups of 1.6 to 1.9, the hydroxyalkoxyl groups being classified into substituted hydroxyalkoxyl groups having hydroxyl groups of hydroxyalkoxyl groups substituted further with methoxyl groups and unsubstituted hydroxyalkoxyl groups having hydroxyl groups of hydroxyalkoxyl groups not further substituted and a ratio (A/B) of a molar fraction (A) of the substituted hydroxyalkoxyl groups to a molar fraction (B) of the unsubstituted hydroxyalkoxyl groups being from 0.4 to 0.8; wherein
   the step for obtaining the water-soluble hydroxyalkyl methylcellulose comprises a stage of adding the hydroxyalkyl etherification agent and the methyl etherification agent so that 40% by weight or greater of a stoichiometric amount of the methyl etherification agent remains unreacted upon completion of the reaction of 60% by weight or greater of a stoichiometric amount of the hydroxyalkyl etherification agent, wherein a ratio of addition time of the methyl etherification agent to addi-

TABLE 2

| | type of pulp | methyl chloride (MC) added (g) | ethylene oxide (EO) added (g) | addition time ratio of MC/EO | substitution degree of methoxyl group | molar substitution of hydroxyethoxyl group | A/B*$^1$ | weight average polymerization degree | dissolution temperature (° C.) | thermo-reversible gel strength (g/cm$^2$) |
|---|---|---|---|---|---|---|---|---|---|---|
| Example 6 | wood pulp | 256 | 8 | 3 | 1.8 | 0.07 | 0.8 | 1100 | 27 | 145 |
| Example 7 | cotton pulp | 190 | 6 | 1.8 | 1.7 | 0.05 | 0.7 | 12000 | 21 | 190 |
| Example 8 | wood pulp | 265 | 11 | 1.5 | 1.9 | 0.1 | 0.6 | 400 | 30 | 100 |
| Example 9 | wood pulp | 256 | 8 | 1.3 | 1.6 | 0.07 | 0.4 | 1300 | 22 | 90 |
| Comp. Ex. 4 | wood pulp | 256 | 16 | 1 | 1.8 | 0.15 | 0.4 | 1100 | 37 | 15 |
| Comp. Ex. 5 | wood pulp | 256 | 27 | 1.2 | 1.7 | 0.25 | 0.5 | 1100 | 45 | 8 |
| Comp. Ex. 6 | wood pulp | 256 | 2 | 1.5 | 1.6 | 0.02 | 0.6 | 1300 | 14 | 140 |

*$^1$A ratio (A/B) of a molar fraction (A) of substituted hydroxyethoxyl groups having hydroxyl groups of hydroxyethoxyl groups substituted further with methoxyl groups to a molar fraction (B) of unsubstituted hydroxyethoxyl groups having hydroxyl groups of hydroxyethoxyl groups not substituted further with methoxyl groups.

tion time of the hydroxyalkyl etherification agent falls within 1.3 to 3; and wherein the dissolution temperature of the water soluble hydroxyalkyl methylcellulose is in the range of 20 to 30° C.

2. The method for preparing water-soluble hydroxyalkyl methylcellulose according to claim 1, wherein said hydroxyalkoxyl groups are hydroxypropoxyl groups or hydroxyethoxyl groups.

* * * * *